United States Patent [19]

Goans

[11] Patent Number: 4,838,303
[45] Date of Patent: Jun. 13, 1989

[54] BUOYANCY OPERABLE LIQUID LEVEL SENSOR FOR CONTROLLING AN ALARM PRESSURE FLUID SUPPLY RESPONSIVE TO CHANGES OF LIQUID LEVEL IN A PRESSURE VESSEL

[76] Inventor: Kip B. Goans, 2576 Apollo Ave., Harvey, La. 70058

[21] Appl. No.: 917,591

[22] Filed: Oct. 14, 1986

[51] Int. Cl.$^4$ .................. F16K 31/28; F16K 33/00; F16K 37/00
[52] U.S. Cl. ................... 137/423; 73/307; 116/228; 137/424; 137/434; 137/558
[58] Field of Search ............... 73/307; 116/227, 228, 116/229; 137/386, 399, 424, 558, 434

[56] References Cited

U.S. PATENT DOCUMENTS

| | | | |
|---|---|---|---|
| 2,022,430 | 11/1935 | Nold | 137/104 |
| 2,176,494 | 10/1939 | Garske | 137/104 |
| 2,322,166 | 6/1943 | Shaw | 137/69 |
| 3,256,907 | 6/1966 | Clark et al. | 137/558 |
| 3,688,795 | 9/1972 | Taylor | 137/558 |
| 4,483,367 | 11/1984 | Ross, Jr. et al. | 116/229 |

Primary Examiner—George L. Walton
Attorney, Agent, or Firm—Hubbard, Thurman, Turner & Tucker

[57] ABSTRACT

A liquid level sensor connects a buoyancy device in a vessel to an end of one member of a two piece mechanical linkage projecting through a flexible pressure sealed opening in the closed end of the sensor body with the outer ends of the two members overlapping and connected by a pivot point. The second member is rigidly secured to a sensor body and defines a fluid pressure receiving passage which connects with a diametrically disposed bore within which a poppet valve is mounted. The poppet valve normally prevents the flow of pressure through the diametrical bore and outward through a radial outlet in the sensor body to actuate an alarm. Upon a deviation of the liquid level in the vessel from the desired level, the buoyancy device produces vertical pivotal movement of the one member of the two piece mechanical linkage which forces the poppet valve to a position permitting pressured fluid to flow therethrough and to energize an alarm.

3 Claims, 1 Drawing Sheet

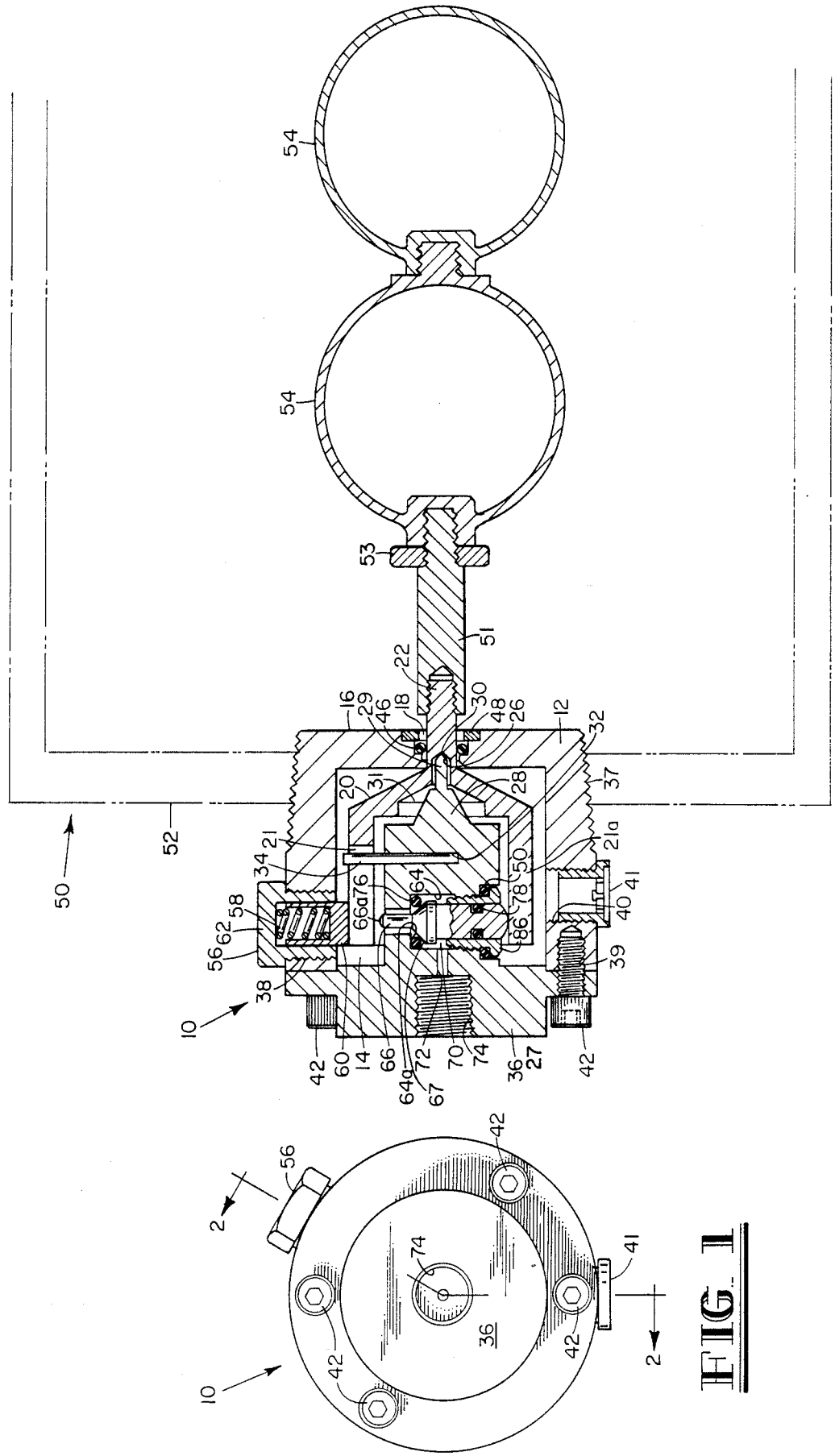

BUOYANCY OPERABLE LIQUID LEVEL SENSOR FOR CONTROLLING AN ALARM PRESSURE FLUID SUPPLY RESPONSIVE TO CHANGES OF LIQUID LEVEL IN A PRESSURE VESSEL

BACKGROUND OF THE INVENTION

The invention relates generally to liquid level sensors, and more particularly to those for controlling an alarm pressure fluid supply responsive to changes of liquid level in a pressure vessel.

A search of the prior art disclosed the following references: B. E. Shaw, U.S. Pat. No. 2,322,166 for Air Volume Control; W. B. Nold, U.S. Pat. No. 2,022,430 for Valve and Float; and J. L. Garske, U.S. Pat. No. 2,176,494 for a Ball Cock.

Shaw teaches an air pressure control device for a hydropneumatic system in which a pressure tank water-level is float monitored to release a spring pressured relief valve to open when water level is low and tank pressure is higher than the spring pressure keeping the relief valve closed.

Nold teaches a combination float and hand controlled valve for regulating compressed liquid refrigerant from the compressive side to the cumulator side of the system.

Garske teaches a float controlled valve in a flush tank that is assisted in closing the pressure water supply thereto by the pressure of the supplied water.

The invention teaches a liquid level sensor mounted on the side of a pressure vessel. A two part mechanical linkage is mounted in and extends through an otherwise closes sensor end and an aperture in the vessel side and connects with a vessel float for sensing changes in liquid level from a predetermined base level to actuate, with no pressure interchange or release, a poppet valve slidably mounted in a part of the mechanical linkage mounted in the sensor to release an alarm flow of pressure fluid supply from an outside source. A change of 180 degrees in mounting the poppet valve changes the sensor from acting as a falling liquid sensor to a rising level liquid sensor.

SUMMARY OF THE INVENTION

It is an object of the invention to provide a buoyancy operable liquid level sensor for controlling an alarm pressure fluid supply responsive to changes in the liquid level of a pressure vessel in which a two piece mechanical linkage is employed to interconnect a float mechanism within the vessel to a poppet valve located exteriorly of the vessel in a sensor body. The sensor body comprises a generally cylindrical element defining oppositely disposed open and closed ends. Such body is threadably secured in a vertical wall of the vessel with the closed end located on the inside of the vessel and defining a relatively small diameter central passage into the vessel. An annular flexible seal element is disposed in this central passage. The first linkage member has a small diameter solid stem portion projecting through the flexible annular sealing element into the vessel and sealably engagable with the flexible annular sealing element, thereby permitting limited vertical movement of the first linkage member without permitting leakage from the vessel. One or more float elements are secured to the inner end of the solid stem portion of the first linkage member and impart a vertical pivotal movement of the first linkage member in response to the liquid level existing within the vessel.

The first linkage member also has an enlarged diameter hollow cylindrical portion secured to the solid stem portion and disposed within the generally cylindrical body element. Spring biasing means are radially disposed in the wall of the cylindrical body element and engage the enlarged cylindrical portion of the first linkage member to oppose the weight of the floats and thereby position the first linkage member in a neutral position when the liquid in the vessel is at a desired level.

The juncture of the enlarged hollow cylindrical portion of the first linkage member with the solid stem portion defines a pivot recess which provides a fulcrum for the second linkage member. The second linkage member is essentially solid and is shaped similar to the first linkage member but is of smaller diameter so that it may be freely inserted within the enlarged hollow cylindrical portion of the first linkage member. A reduced diameter solid projection is formed on the inner end of the second linkage member and is shaped to define a fulcrum cooperating with the recess in the first linkage member. The second linkage member is further provided with an enlarged cap portion which is sealably secured to the open end of the sensor body element. Thus, the second linkage member is rigidly secured to the body element and hence to the vessel. When the liquid contained in the vessel is under pressure, any outwardly directed forces exerted on the first linkage member are absorbed by the fulcrum formed on the reduced diameter end portion of the second linkage member, and the first linkage member is continually pivotable about the fulcrum provided by the second linkage member.

An axial passage is provided in the cap portion of the second linkage member and communicates with a radially disposed valve bore. Such axial passage is connectable to a source of fluid pressure. A radial fluid pressure outlet is formed in the wall of the cylindrical body element and this outlet is in turn connected to a fluid pressure operated alarm.

A poppet valve is mounted in the radially disposed bore provided in the second linkage member and such poppet valve has an end projecting radially beyond the periphery of the cylindrical medial portion of the second linkage member so that it can be contacted by vertical pivotal movement of the first linkage member. If the level of liquid in the vessel either rises above or falls below a desired level, the resulting vertical movement of the first linkage member produced by the floats results in a radial displacement of the poppet valve which opens a fluid passageway through the radial bore and communicates with the radial pressure outlet provided in the wall of the central body. Thus, an alarm will be sounded indicating that the liquid level has departed from its desired position.

It should be noted that the level sensor embodying this invention will not concurrently detect departures in both directions from a desired level but is unidirectional in its action. Thus, the sensor element may be mounted so that a drop in liquid level below a desired level effects the operation of the poppet valve to operate the alarm or, alternatively, by angularly shifting the position of the second linkage member relative to the body element by 180°, the sensor will operate to detect departures of the liquid upwardly from the desired level and sound an alarm when any such departure occurs.

Further advantages of the invention will be readily apparent to those skilled in the art from the following detailed description, taken in conjunction with the annexed sheet of drawings on which is shown a preferred embodiment of the invention.

BRIEF DESCRIPTION OF THE DRAWINGS

FIG. 1 is a rear elevational view of the invention; and

FIG. 2 is a cross-sectional view along section lines 2—2 of FIG. 1.

DETAILED DESCRIPTION OF THE PREFERRED EMBODIMENTS

Referring to FIGS. 1 and 2, the invention comprises a liquid level sensor 10 having a cylindrical body 12 with oppositely disposed open end 14 and closed end 16 defining an aperture 18. A two piece mechanical linkage comprises a first cone shaped linkage that is closed at the cone end to define a projection 22 for extending through aperture 18 and defining an interior pivot recess 26, and at the oppositely disposed end is cylindrically shaped and open to loosely receive a second linkage member 28 similarly cone shaped and having a reduced diameter stem 29 at one end to define a pivot point or fulcrum 30 for engaging in pivot recess 26, and cylindrically shaped in the middle to loosely fit within the first linkage member 20 for defining a valve chamber 31. Second linkage member 28 has a radially extending hole 32 for a guide pin 34 and an enlarged outer base end 36 shaped and adapted to close sensor body 12 open end 14 to hold the sensor operably together.

Referring more particularly to FIG. 2, the sensor cylindrical body 12 defines external screw threads 37 adjacent closed end 16, radially extending threaded holes 38 and 40 adjacent open end 14 and angularly spaced apart 180°, and two pairs of bolt holes 39 spaced symmetrically apart by 180° extending longitudinally to respectively receive bolts 42 extending through base end 36 and into the wall of cylindrical body 12. Aperture 18 is pressure selected flexible around projection 22 by an elastomeric seal 46 and a seal retainer ring 48 to prevent any interchange of pressure from or to any atached pressure vessel 50, especially around projection 22. Extension rod 51, lock nut 53, and displacers or floats 54 are necessary parts but do not constitute the invention.

Thus, first linkage member 20 can pivot in a vertical plane in response to changes in liquid level in vessel 50.

A counterbalance assembly or device 56 is threadably engaged in radial hole 38 of body 12 for offsetting the weight or floats or displacers 54 and comprises a spring 58 mounted in a combination spring guide and piston 60 slidably mounted in a cylindrical cap 62 that is threadably engaged in opening 38 for piston 60 to spring pressure engage first linkage member 20 adjacent its open end. Radial opening 40 defines an exit for pressured fluid supplied from sensor 10.

Second linkage member 28 is roughly bottle shaped and loosely fits within the enlarged hollow portion of first linkage member 20. The guide pin 34 cooperates with an axial slot 21 in the wall or first linkage member 20 to restrict the movements of first linkage member 20 to movement in a vertical plane. A diametrical passage 64 extends through the medial portion of the second linkage member 28 and houses a poppet valve 66. Poppet valve 66 is also bottle shaped with slant shoulders 67 and with bottle end 66a extending beyond the periphery of second linkage member 28 to be engaged by first linkage member 20, and is slidably mounted in a threaded retainer 68 that is engaged in the threaded outer end of passage 64. A fluid pressure supply space 70 is defined between the passage 64 and poppet valve 66 that is connected through a passage 72 to a pressure fluid supply inlet 74, both defined in base end 36 of second linkage member 28. Pressure fluid supply is confined to space 70 by poppet seal 76 between the square shoulders 64a of passage 64 and slant shoulders 67 of poppet valve 66, and at the other end of the passage 64 by guide seal 78 between poppet valve 66 and its guide retainer 68, and by a retainer seal 80 between guide retainer 68 and linkage piece 28.

In operation, the sensor 10 is screwed into the side wall 52 of a pressure vessel 50 with the projection 22 extending from flexibly sealed aperture 18 as part of the mechanical linkage 51 for connecting buoyancy means 54 operably with poppet valve 66. A pressure fluid supply (not shown) is connected to inlet 74. Counterbalance spring 58 opposes the weight of the buoyancy means 54 and extension 51 of projection 22. As shown in FIG. 2, pressured fluid is retained in supply space 70, but if the liquid level rises in the pressure vessel 50, the buoyancy means 54 will rise and projection 22 will pivot first linkage member 20 to move downward and unseal poppet valve seal 64 and release pressured supply fluid into sensor chamber 31 and out exit 41 to warn or operate warning devices (not shown) that the liquid level is rising and that liquid should not be added to the pressure vessel until the flow from the sensor exit stops, that is when the predetermined liquid level in the pressure vessel is reached. As shown the invention is assembled to act as a high level or rising level sensor. By simply removing bolts 42 the second linkage member 28 can be rotated 180 degrees and with the bolts refastened the sensor acts as a low level or falling level sensor. Practically all the friction of operation is generated between the guide seals 78 and the poppet valve guide surface. This friction can be nullified by changing the compressibility of poppet valve seal 76 and the angle of slant of the shoulders 67.

What is claimed and desired to be secured by Letters Patent is:

1. A liquid level indicator operable by a float mounted in a vessel containing the liquid comprising, in combination:

a generally cylindrical body defining oppositely disposed open and closed ends;

means for securing said cylindrical body in a vertical wall opening in said vessel with said open end disposed outwardly of said vessel;

said closed end defining a central passage into said vessel;

annular, flexible seal means disposed in said central passage;

a first linkage member having a small diameter solid stem portion projecting through said flexible annular sealing means into said vessel and sealably engagable with said flexible annular sealing means, thereby permitting limited vertical movement of said first linkage member;

means for securing said stem portion to said float;

said first linkage member also having an enlarged diameter hollow cylindrical portion secured to said solid stem portion and disposed within said generally cylindrical body;

spring biasing means radially disposed in the wall of said generally cylindrical body and engaging said enlarged cylindrical portion of said first linkage member to oppose the weight of said float and position said first linkage member in a neutral position when the liquid in said vessel is at a desired level;

a second linkage member having a cylindrical cap portion overlying and secured to said open end of said generally cylindrical body, a medial cylindrical portion insertable within said hollow cylindrical portion of said first linkage member, and a solid reduced diameter end portion defining a horizontal fulcrum engaging the outer end of said stem portion of said first linkage member;

a passage in said second linkage member for receiving a pressure fluid;

pressured fluid outlet means in the wall of said generally cylindrical body connectable to a pressure actuated warning device; and normally closed valve means in said second linkage member controlling flow of pressured fluid to said pressured fluid outlet means, said valve means being operable to an open position by a selected vertical movement of said first linkage member produced by a change in liquid level in said vessel, whereby said selected vertical movement is achieved by said first linkage member cooperating with said second linkage member through said fulcrum of said second linkage member.

2. The apparatus of claim 1 wherein said normally closed valve means comprises:

a radially disposed bore in said medial cylindrical portion of said second linkage member communicating with said passage for receiving a pressured fluid;

said bore having a reduced diameter portion communicating with the exterior of said second linkage member;

a piston valve slidably mounted in said bore and having a projection extending through said reduced diameter portion with an end disposed exteriorly of said second linkage member when fluid pressure is applied to said piston valve; and sealing means in said bore engaging said piston valve to prevent flow of pressured fluid out of said bore to said pressured fluid outlet means when the liquid in said vessel is at a selected level, and to permit pressured fluid to flow to said pressured outlet means by vertical, pivotal movement of said first linkage member to depress the outer end of said piston valve into said bore.

3. A liquid level indicator operable by a float mounted in a vessel containing the liquid comprising, in combination:

a generally cylindrical body defining oppositely disposed open and closed ends;

means for securing said cylindrical body in a vertical wall opening in said vessel with said open end disposed outwardly of said vessel;

annular, flexible seal means disposed in said central passage;

a linkage member having a small diameter solid stem portion projecting through said flexible annular sealing means into said vessel and sealably engagable with said flexible annular sealing means, thereby permitting limited vertical movement of said linkage member;

means for securing said stem portion to said float;

said linkage member also having an enlarged diameter hollow cylindrical portion secured to said solid stem portion and disposed within said generally cylindrical body;

a valve housing sealingly secured to the outer open end of said generally cylindrical body and disposed within said enlarged diameter hollow portion of said linkage member;

said valve housing defining a fulcrum engagable by said linkage member for limited pivotal movement of said linkage member in a vertical plane in response to changes in liquid level in said vessel;

valve means in said valve housing operable by a selected direction of vertical pivotal movement of said linkage member whereby said selected vertical movement is achieved by said linkage member cooperating with said valve housing through said fulcrum of said valve housing; and indicating means operable by said valve means.

* * * * *